(12) United States Patent
Catalano

(10) Patent No.: US 7,735,573 B2
(45) Date of Patent: Jun. 15, 2010

(54) LAWN PERFORATING TOOL AND METHOD OF USING SAME

(76) Inventor: Frank Catalano, 82 Carriage Crossing, Middletown, CT (US) 06457

( * ) Notice: Subject to any disclaimer, the term of this patent is extended or adjusted under 35 U.S.C. 154(b) by 299 days.

(21) Appl. No.: 11/730,250

(22) Filed: Mar. 30, 2007

(65) Prior Publication Data

US 2007/0256845 A1 Nov. 8, 2007

Related U.S. Application Data

(60) Provisional application No. 60/789,368, filed on Apr. 5, 2006.

(51) Int. Cl.
A01B 39/00 (2006.01)
(52) U.S. Cl. .................. 172/349; 172/378
(58) Field of Classification Search ............ 172/349, 172/351, 378, 15, 21, 49, 368, 329, 380, 172/540, 545, 548, 65, 575; 30/173, 205, 30/231, 240, 265, 302, 306, 307, 346.59, 30/346.6; D15/29; 111/140; D8/7, 8
See application file for complete search history.

(56) References Cited

U.S. PATENT DOCUMENTS

| | | | | |
|---|---|---|---|---|
| 39,389 A | * | 8/1863 | Ernst | 172/153 |
| 930,951 A | * | 8/1909 | Fox et al. | 172/645 |
| 1,320,875 A | * | 11/1919 | Lesh | 172/349 |
| 1,371,706 A | * | 3/1921 | Paloheimo | 172/349 |
| 1,532,986 A | * | 4/1925 | Branson | 172/551 |
| 1,807,182 A | * | 5/1931 | Stoner | 172/21 |
| 2,022,335 A | * | 11/1935 | Bernthal | 172/547 |
| 2,244,099 A | * | 6/1941 | Chase | 172/21 |
| 2,250,075 A | * | 7/1941 | Werb | 172/145 |
| 2,509,343 A | * | 5/1950 | Henderson | 56/294 |
| 2,560,359 A | * | 7/1951 | McCardell | 172/556 |
| 2,656,868 A | * | 10/1953 | Hintz et al. | 241/55 |
| 2,847,922 A | * | 8/1958 | Stephenson | 172/548 |
| 3,062,300 A | * | 11/1962 | Bullard | 172/21 |

(Continued)

FOREIGN PATENT DOCUMENTS

FR 2584888 A1 * 1/1987

(Continued)

OTHER PUBLICATIONS

Canadian Organic Growers, "Ecological Weed Management", COG Reference Series #10, Section 3.7-3.7.5, 3.10 (2004). <URL: http://www.cog.ca/documents/RS10.pdf>.

Primary Examiner—Thomas B Will
Assistant Examiner—Jamie L McGowan
(74) Attorney, Agent, or Firm—Chalin A. Smith; Smith Patent Consulting

(57) ABSTRACT

Disclosed herein is a lawn perforating tool and method of using same to prepare new lawn or garden areas or distressed regions of existing lawns or gardens for the planting of seed, example of which include, but are not limited to, grass seed, clover seed, wildflower seed, and the like. The lawn perforating tool of the present invention is particularly configured to provide in the soil and dead grass holes or indentations of a size, shape, and depth that is optimal for receiving and germinating new grass seed and of a density and distribution suitable to provide the resulting grass with a visually desirable pattern, rendering new growth indistinguishable from old growth.

29 Claims, 9 Drawing Sheets

U.S. PATENT DOCUMENTS

| | | | |
|---|---|---|---|
| 3,102,376 A * | 9/1963 | Henderson | 56/294 |
| 3,340,937 A * | 9/1967 | Vanderveer | 172/350 |
| 3,437,154 A * | 4/1969 | Anesi | 172/350 |
| 3,452,823 A * | 7/1969 | Shapland, Jr. | 172/21 |
| 3,605,907 A * | 9/1971 | Schuring | 172/378 |
| D251,768 S * | 5/1979 | Dellinger | D8/7 |
| 4,206,714 A | 6/1980 | Walsh | |
| 4,336,845 A | 6/1982 | Kolb | |
| 4,364,437 A * | 12/1982 | Haapala | 172/349 |
| D268,000 S | 2/1983 | Dellinger | |
| 4,424,869 A | 1/1984 | Vom Braucke et al. | |
| D273,656 S * | 5/1984 | Dellinger | D8/8 |
| 4,616,714 A | 10/1986 | Lister | |
| 4,678,043 A | 7/1987 | Vom Braucke et al. | |
| 4,800,609 A * | 1/1989 | Peck | 15/210.1 |
| 4,821,655 A | 4/1989 | Rizzo | |
| 5,048,883 A * | 9/1991 | Waluk | 294/54.5 |
| 5,060,343 A | 10/1991 | Nisenbaum | |
| 5,207,466 A | 5/1993 | Ohlson | |
| 5,461,995 A * | 10/1995 | Winterton | 111/139 |
| 5,488,917 A | 2/1996 | Santoli et al. | |
| 5,787,990 A | 8/1998 | Miller | |
| 6,076,614 A * | 6/2000 | Gracy | 172/379 |
| 6,289,828 B1 | 9/2001 | Wittenberg | |
| 6,463,727 B2 | 10/2002 | Blyth | |
| 6,488,101 B1 * | 12/2002 | Miyahara et al. | 172/46 |
| 6,523,618 B2 * | 2/2003 | Firdaus | 172/540 |
| 2003/0024450 A1 | 2/2003 | Juptner | |
| 2003/0136566 A1 | 7/2003 | Saeger | |
| 2005/0147470 A1 * | 7/2005 | Fimbinger | 404/131 |
| 2006/0070753 A1 | 4/2006 | Lephart et al. | |

FOREIGN PATENT DOCUMENTS

| | | | |
|---|---|---|---|
| GB | 1380301 A * | 1/1975 | |
| GB | 2016251 A * | 9/1979 | |
| GB | 2221600 A * | 2/1990 | |

* cited by examiner

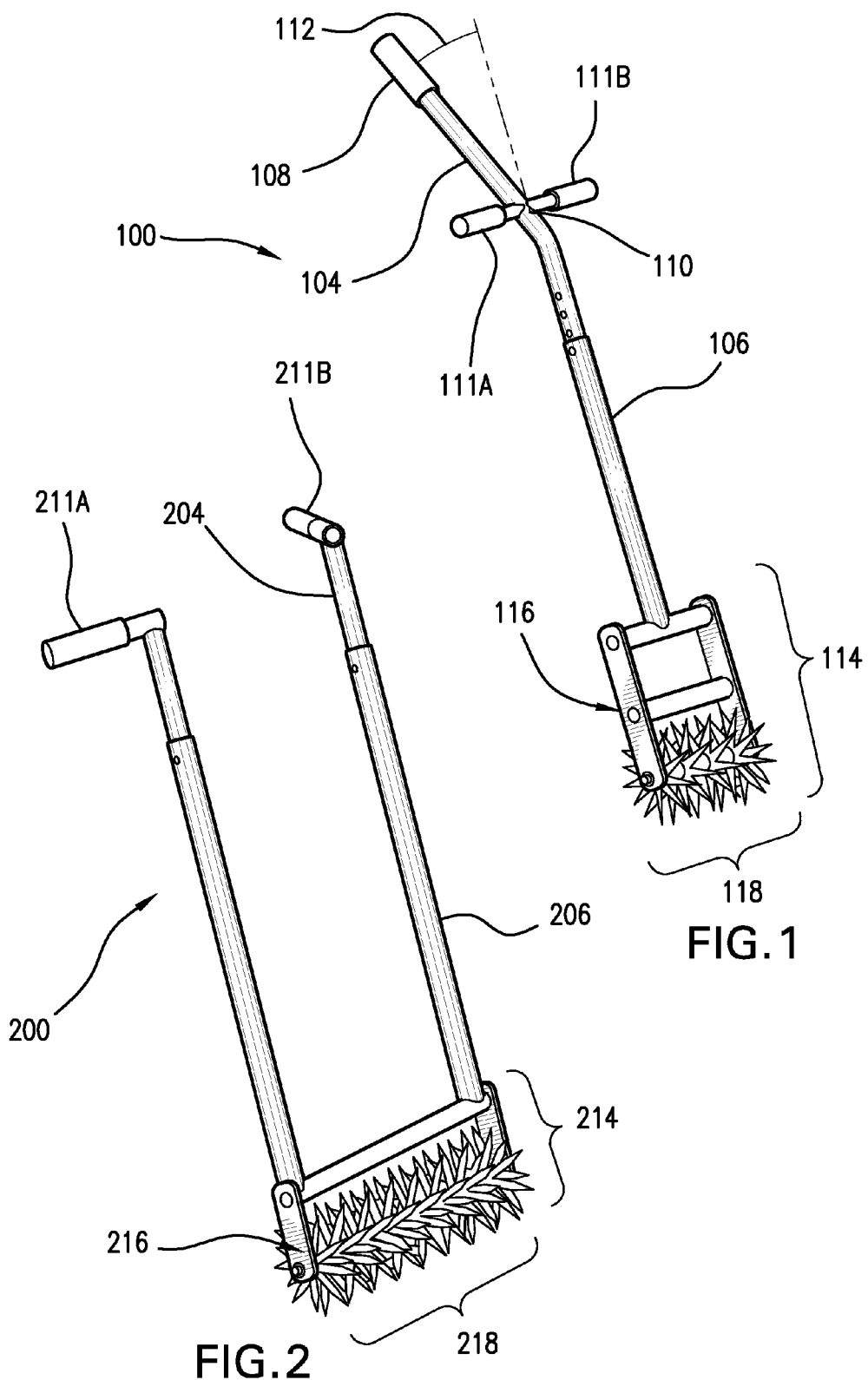

LAWN PERFORATING TOOL AND METHOD OF USING SAME

PRIORITY

This application claims the benefit of U.S. Provisional Application Ser. No. 60/789,368 filed Apr. 5, 2006, the contents of which are incorporated by reference herein in its entirety.

TECHNICAL FIELD OF THE INVENTION

The present invention relates generally to a tool for perforating lawn and garden areas in preparation for seed applications. More particularly, the invention relates to a lawn perforating tool and method of using same to prepare new lawn or garden areas or distressed regions of existing lawns or gardens for the planting of new seed, for example grass seed, clover seed, wildflower seed, and the like.

BACKGROUND OF THE INVENTION

Diseases, pests, irrigation difficulties and other factors can create regions of dead and/or dying grass and/or bare soil in existing lawns. Prior to sowing seed in these regions, so as to restore the lawn, one must first prepare the ground for planting. To that end, it is necessary to produce indentations or holes (also referred to herein as "perforations") in the lawn, preferably of a depth and size that maximizes seed-to-soil contact and is suitable for the germination of seed placed therein. The distribution of the holes must have density sufficient to allow the resulting plant growth to form a continuous grassy surface. In addition, it is desirable to provide spacing between the holes, and to the pattern the holes in a non-uniform manner to thereby prevent the resulting grass from having a visually objectionable pattern. A tool optimized for this utility should also be capable of tilling or plowing the neighboring earth; in particular, it is desirable to push up and loosen the soil around the hole so as to create a soft mound of soil that will readily crumble around the seed after watering. Finally, it is further desirable to configure the tool to minimize operator fatigue and muscle strain or, alternatively, to work in conjunction with a powered implement, such as a tractor or small engine.

There are a number of commercially available tools designed to loosen, cut, crumble and/or cultivate garden soil or the like. For example, U.S. Pat. Nos. 3,605,907 (Schuring et al.), 4,424,869 (vom Braucke et al.), and 4,678,043 (vom Braucke et al.) disclose various small hand tools specifically designed for such purposes. In addition, a variety of manual and automated lawn seeding machines are known in the art. However, none of the presently available options are capable of producing the optimized lawn perforations as described above while at the same time maximizing efficiency and minimizing operator fatigue. Thus, there remains a clear need in the art for a lawn tool capable of efficiently and effectively preparing a damaged area of lawn for reseeding. The present invention is directed to such a need.

SUMMARY OF THE INVENTION

In view of the foregoing, it is a primary object of the present invention to provide an improved lawn perforating tool which allows a user to prepare a new lawn area or damaged area of lawn for seeding. To that end, the present invention provides a unique lawn perforating tool having working head composed of a series of intersecting, non-planar, wheel-like perforating plates that freely rotate about a working head axle, each of the perforating plates provided with two or more angled radial arms particularly configured to not only penetrate soil to a desired depth but also produce a non-uniform pattern of perforations optimal for new growth.

It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is, accordingly, an object of this invention to provide a lawn perforating tool which allows a user to prepare a lawn, particularly one or more damaged lawn areas, for seeding (or reseeding).

It is also an object of this invention to provide a lawn perforating tool which produces indentations or holes having non-uniform, irregular spacing and a controlled depth in areas of soil and dead grass.

It is further an object of the present invention to provide a lawn perforating tool that penetrates the soil in a sideways direction, creating an optimally sized, shaped, and positioned hole that can readily receive seed. In a preferred embodiment, this sideways action provides the tool with a tilling or plowing action, by loosening, and/or softening neighboring soil and creating soft mounds of soil that will readily crumble around a seed after watering.

It is further an object of this invention to provide a lawn perforating tool that prepares lawn areas for seeding while minimizing operator fatigue. To that end, in a preferred embodiment, it may be desirable to include an adjustable handle portion, for example utilizing telescoping shafts or tubes, and/or one or more ergonomic, elastomeric hand grips. In another embodiment, the lawn perforating tool may be coupled to powered implement such as a tractor of small engine.

These and other objects and features of the invention will become more fully apparent when the following detailed description is read in conjunction with the accompanying figures and examples. However, it is to be understood that both the foregoing summary of the invention and the following detailed description are of a preferred embodiment, and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims.

Likewise, other objects, features, benefits and advantages of the present invention will be apparent from this summary and certain embodiments described below, and will be readily apparent to those skilled in the art. Such objects, features, benefits and advantages will be apparent from the above as taken into conjunction with the accompanying examples, data, figures and all reasonable inferences to be drawn therefrom, alone or with consideration of the references incorporated herein.

BRIEF DESCRIPTION OF THE DRAWINGS

Various aspects and applications of the present invention will become apparent to the skilled artisan upon consideration of the brief description of the figures and the detailed description of the present invention and its preferred embodiments which follows:

FIG. 1 depicts a single shaft embodiment of a lawn perforating tool designed in accordance with the principles of the present invention.

FIG. 2 depicts a double shaft embodiment of a lawn perforating tool designed in accordance with the principles of the present invention.

DETAILED DESCRIPTION OF THE PREFERRED EMBODIMENTS

Figure 3A:
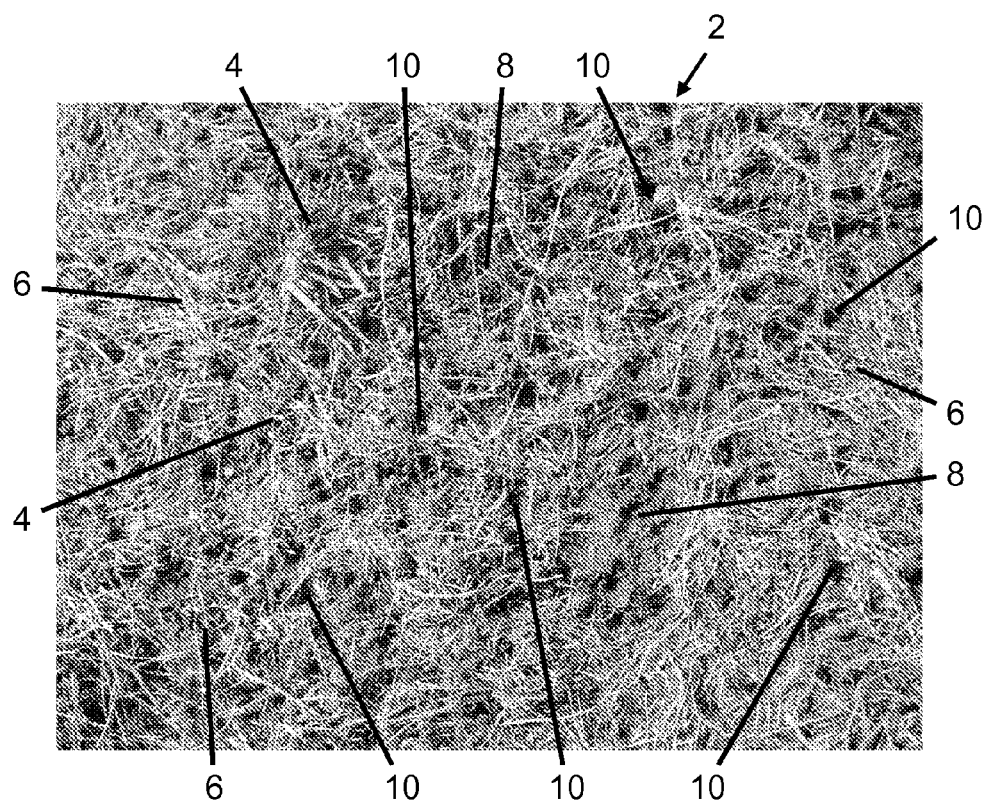
FIG. 3A depicts a portion of a lawn having dead and dying grass, and bare soil following preparation for planting with seed using a lawn perforating tool designed in accordance with the principles of the present invention.

Although any methods and materials similar or equivalent to those described herein can be used in the practice or testing of embodiments of the present invention, the preferred methods, devices, and materials are now described. However, before the present materials and methods are described, it is to be understood that this invention is not limited to the particular sizes, shapes, dimensions, materials, methodologies, protocols, etc. described herein, as these may vary in accordance with routine experimentation and optimization. It is also to be understood that the terminology used in the description is for the purpose of describing the particular versions or embodiments only, and is not intended to limit the scope of the present invention which will be limited only by the appended claims.

Unless otherwise defined, all technical and scientific terms used herein have the same meaning as commonly understood by one of ordinary skill in the art to which this invention belongs. However, in case of conflict, the present specification, including definitions, will control.

In the context of the present invention, the following definitions apply:

The words "a", "an" and "the" as used herein mean "at least one" unless otherwise specifically indicated. Thus, for example, reference to a "rotatable plate" is a reference to one or more such plates and equivalents thereof known to those skilled in the art, and so forth.

The term "proximal" as used herein refers to that end or portion which is situated closest to the user of the device, farthest away from the working head and earthen area being treated. In the context of the present invention, the proximal end of the inventive device includes the handle portion.

The term "distal" as used herein refers to that end or portion situated farthest away from the user of the device, closest to the earthen site. In the context of the present invention, the distal end of the inventive device includes the working head and plurality of rotatable perforating plates.

The term "rotational" is used herein to refer to the revolutionary movement of the perforating plates, more particularly paired plate assemblies, about the axle. In the context of the present invention, rotation of the paired plate assemblies results in the production holes or indentations (i.e., perforations) in the soil, such perforations having size and shape optimized for receiving grass seed and present in a random or non-uniform pattern of perforations therein.

The term "axial" as used herein refers to the direction relating to or parallel with the longitudinal axis of the device. In the context of the present invention, the application of axial force to the device by the user, for example by pushing the handle portion and/or pressing the optional foot bar, results in both a downward pressure that drives the sharpened tines (i.e., spikes) of the perforating plates into the soil so as to produce one or more holes or indentations (i.e., perforations) in the soil suitable for receiving seeds, for example grass seeds, and a forward pressure that drives the rotation of the paired plate assemblies, which, in turn, results a random pattern of perforations in the soil.

As used herein, the term "tapered" refers to a gradual decrease in size toward a sharp point or tip. Likewise, the term "beveled" is used herein to refer to a surface or end that is slanted or inclined, at an angle other than 90 degrees. In the context of the present invention, each perforating plate is comprised of a plurality of radially projecting arms. In one embodiment, the free ends of the arms may be tapered spikes or tines, each of which is provided with a sharp knife-like edge. In another embodiment, the free arm ends are alternately tapered or beveled. The tapered arms are referred to herein as spikes or tines while the beveled arms are referred to as spike supports. In either embodiment, the spikes should be sufficiently sharp, provided with one or more cutting edges capable of slicing grass and puncturing soil, thereby creating holes or indentations ("perforations") sized and shaped to readily receive grass seed and allow it to germinate and grow. More particularly, each spike is preferably sized and shaped to yield a perforation the can receive 1 to 5 seeds, more preferably 2 to 4 seeds, thereby avoiding the problems of overlapping and crowding of grass seed which, in turn, can result in dampening off or seed rot. To that end, the length of each spike is preferably 1 to 4 inches, more preferably about 3 inches.

As used herein, the term "acute" refers to an angle that is less than 90 degrees. Conversely, the term "obtuse" refers to an angle that is more than 90 degrees.

As used herein, the term "convex" refers to a surface or boundary that curves or bulges outward, as the exterior of a sphere. Conversely, the term "concave" refers to surface or boundary that curves inward, as the inner surface of a sphere. The perforating plates of the present invention have overall non-planar configuration that may be described as "convex"

or "concave", depending upon the point of reference. This configuration results from the fact that at least one of the radially projecting arms of each penetrating plate is disposed at an angle relative to a central bore axis. This angled arrangement allows one or more of the radial arms to penetrate the soil in a sideways direction, thereby creating holes of optimized size, shape, depth, and density.

As discussed above, the lawn perforating tool of the present invention is composed of a handle portion and a working portion. The handle portion preferably includes one or more drive shafts. It is desirable for each drive shaft to be "fitted" to the intended user or application, for example through the use of telescoping tubes that allow the overall length of the drive shaft to be adjusted as needed. In addition, depending upon the application, each drive shaft may be relatively straight or bent, at a fixed or adjustable angle. Each drive shaft is preferably formed from a suitably rigid and durable material capable of withstanding without bending. Examples of such materials include metals, particularly steel, iron and aluminum, and rigid plastics such as thermoset polyurethane, polycarbonates, and PVC. Materials with a tensile strength of at least 7,000 Psi, more preferably at least 10,000 Psi, even more preferably 12,000 Psi or higher are most suitable. The selected material be initially fabricated and subsequently formed into one or more tool components using any conventional process, for example through casting, molding or extrusion processes.

When designed for human powering, each drive shaft is preferably provided with one or more hand grips. The one or more hand grips are preferably formed from a soft elastomeric material, such as rubber, thermoplastic polyolefins, and polyethylenes. In one preferred embodiment, the hand grips are slidably disposed about the proximal end of the drive shafts and provided with one or more finger recesses. In a preferred embodiment, the hand grips extend from the drive shaft in a relatively transverse fashion. In certain preferred embodiments, the relative angle between each hand grip and drive shaft may be adjusted to suit the individual user or intended use.

When designed for use with a powered or motorized implement, such as tractor or small engine, the drive shaft(s) may be provided with a connecting means, for example a cupped element designed to engage a standard trailer hitch.

In contrast to conventional tools for loosening, cutting or crumbling garden soil, most of which are hand tools, the lawn perforating device of the present invention is in one embodiment designed to be powered by a user's leg or foot, with the user's hands serving to hold the device upright and guide it along its intended path. By placing one's foot on the working head end, foot pressure combine with human weight to drive the wheels in a downward direction, forcing the spikes to the requisite depth for seed germination (typically about 1 to 2 inches). Furthermore, moving the working head over grass areas in a back and forth fashion with one's leg or foot results in a random pattern of holes or indentations. This non-uniform hole pattern provides the best possible opportunity for seed to knit together to, in turn, create a uniform lawn. In contrast, conventional seeding tools typically plant seeds in rows, leaving obvious areas of bare soil.

In the context of the present invention, the working portion or working head of the lawn perforating tool of the present invention is mounted to the distal end of the handle portion, in a generally transverse direction. At a minimum, the working head is comprised of one or more non-planar perforating plates rotatably disposed about one or more axles. Although the number of perforating plates is not critical, for optimal performance it is preferable to utilize an even number of plates arranged in paired assemblies as discussed in detail below. In a preferred embodiment, the working head is provided with two to twenty plates, more preferably four to eighteen, even more preferably eight to sixteen. In that it is preferable to arrange the perforating plates along the axle in coordinating pairs, it is desirable to provide the working head with an even number of plates. To that end, the present invention contemplates a small version, comprised of about 2 to 6 plate pairs, as well as a larger version comprised of about 6 to 16 plate pairs. In addition, the present invention contemplates a working head composed of multiple axles, such an embodiment being particularly suited for use in conjunction with a motorized implement or engine or for being towed behind a tractor or the like.

The working head may also include a frame member, optimally composed of a foot bar mounted above and parallel to one or more axles, said foot bar and axle(s) connected at either end by a pair of side arms. The foot bar may optionally be fitted with a non-slip surface or coating, for example a grip tape layer or knurled metal surface. Each axle preferably comprises a straight shaft that distributes energy evenly across the perforating plates so as to allow for the application of a force sufficient to accomplish the creation of holes at the correct depth.

Each perforating plate is comprised of a central bore, sized to allow the working head axle to slide therethrough, and a plurality of radially projecting arms extending therefrom. Although the number of radial arms is not critical to the present invention, in a preferred embodiment each perforating plate is provided with two to twelve arms, more preferably four to ten, even more preferably four to eight. As noted above, over, one or more of the radial arms disposed at an angle relative to the axle, thereby affording each plate with a non-planar appearance, optimally a concave or convex configuration, depending upon the point of reference. The angled disposition of the radial arms provides the tool with a sideways "plowing" action that yields optimized indentations in the soil. Although the invention is not limited to a particular configuration, in order to achieve the sideways plowing action, it is preferable that the angle formed by each plate arm relative to a plane that includes the central bore axis of the plate ranges from 5 to 45 degrees, more preferably 10 to 30 degrees, even more preferably 10 to 20 degrees.

In a preferred embodiment, the perforating plates are arranged about the axle is coordinating pairs, referred to herein a rotatable subassemblies. In assembly, first and second concave plates are arranged in an offset facing relationship, such that the radially projecting spikes of the first plate interlace with those of the second plate. More particularly, in one preferred embodiment, each tapered arm (or spike) of the first plate extends between two opposing tapered arms (or spikes) of the second plate and vice versa. When the beveled spike supports are utilized, it is preferable that the beveled ends of each spike support of the first plate rests snugly against the surface of an opposing spike on the second plate and vice versa. This arrangement of opposing arms not only affords support to the spikes when penetrating soil, thereby allowing user to apply more pressure so as to reach a depth critical for seed germination, but also enhances the overall shape of the hole that each spike creates. In particular, the hole narrows from a wide mouth to a small niche hole. The wide opening is more accepting of seed spread across it (i.e., catches seeds more easily) and the narrowing furrow funnels the seed down to contact the soil, enhancing the soil to seed contact which is important for seed germination. The spike support also creates more of a plowing action. In use, it pushes up and loosens soil around the hole. The sideways puncture and the enhanced plowing together yield a soft mound of soil that will readily crumble around the seed after watering, causing increased soil to seed contact.

To maintain the coordinating relationship between paired plates, it is desirable to affix the plates to the axle, for example by means of brazing or welding, or alternatively to affix each plate to the other, for example by means of a spacer mechanism. The spacer should not only provide the requisite fixed axial separation between paired plates but also maintain correct alignment of neighboring radial arms and prevent relative movement between paired plates, thereby allowing the paired plates to form single rotatable subassembly. In that the spacer may also be slidably received about the axle, it too may be afforded with a central bore. Thus, in one preferred embodiment, the spacer takes the form of a tubular sleeve. To maintain the paired plates and intermediately disposed spacer as a fixed assembly, it may be desirable to provide each with engaging elements, for example screws and mating screw threads. Alternatively, the spacer sleeve may be provided with a plurality of splines that engage a keyway disposed in the central bore of one or more plates. Other fastening mechanisms are contemplated, including more permanent fastening means such as welding and brazing. In other embodiments, the rotatable paired plate subassemblies may be fabricated as a single unit, thereby avoiding the need to maintain axial separation and alignment.

In addition to providing a spacer element between facing plates, it may also be desirable to include a second spacer element to separate adjacent paired assemblies. Like the first spacer element(s), the second spacer element(s) may be permanently or removably affixed to its neighboring plates. Alternatively, the spacers may simply slide freely along the axle plate pairs.

The lawn perforating device of the present invention is designed to slice through dead grass then puncture the lawn soil, which is often quite hard. Furthermore, in order to achieve germination, it is important that the holes in the soil extend to a sufficient depth. Although seeds may be capable of germinating at depths of less than one inch or greater than two inches, for optimal germination it is preferable to utilize a depth of about 1 to 2 inches. Thus, it is clear that a certain amount of user strength and device integrity is required. The cupped and interlaced perforating plates of the lawn perforating tool of the present invention provide the needed rigidity to apply sufficient force to accomplish the creation of the holes at the necessary depth, typically about 1 to 2 inches. Bending of the spikes will cause the wheels to rotate and roll in a rough and uneven manner which, in turn, results in poor performance or failure of the device. As discussed above, the interlacing of the radial arms gain support from each other, thus preventing bending from applied force. Nevertheless, it is still desirable to construct the perforating plates and their radial arms of high tensile strength material sufficient to accomplish the creation of holes at the necessary depth without bending. Illustrative examples of such materials include, but are not limited to, stamped aluminum, laser cut aluminum, or other cast or cut metals, as well as certain hard plastics.

Hereinafter, the present invention is described in more detail by reference to Figures and Examples. However, the following materials, methods, figures, and examples only illustrate aspects of the invention and are in no way intended to limit the scope of the present invention. As such, methods and materials similar or equivalent to those described herein can be used in the practice or testing of the present invention.

Multiple embodiments of the lawn perforating device of the present invention are contemplated herein. FIG. 1 depicts one embodiment of the lawn perforating tool of the present invention, tool 100 having an elongated proximal portion 104 forming a handle having a proximal portion 104 and a distal portion 106. In a preferred embodiment, proximal portion 104 is offset from distal portion 104 at an angle 112. Proximal portion 104 has at its proximal end single hand grip 108, and at its distal end transverse element 110 from which extend a pair of hand grips 111A and 111B, grips 108, 111A, and 111B being formed from a suitable flexible and/or elastomeric material. Distal portion 106 has at its distal end and mounted thereto transverse assembly 114 having a rigidly mounted frame portion 116, and paired plate subassemblies 118 rotatably mounted to portion 116.

Depending on the size of the damaged lawn area, one may opt for a smaller version (FIG. 1) or larger version (FIG. 2). For example, insect infestation, drought and disease situations typically result in large areas of damaged lawn. Accordingly, a larger model would be preferred. As shown in FIG. 2, in addition to a pair of longer shafts (204, 206), each of which is provided with hand grips (211A, 211B) formed from a suitable flexible and/or elastomeric material, the larger version (200) is further provided with additional paired plate subassemblies 218 rotatably mounted to portion 216 to allow coverage of a large area in less time and with less effort. Conversely, pets spot areas and areas along curbs tend to be smaller, more confined, and thus are more suited for treatment with the smaller model of FIG. 1. As shown in FIG. 1, the smaller model is provided with more concentrated spiking so as to confine perforating to the target damaged area and avoid puncturing healthy areas of the lawn. This concentrated effort maximizes efficiency while minimizing user fatigue. In either embodiment, the handle portion may be straight or optionally bent, for example at the midpoint, to maximize downward pressure and concentrate effort.

FIG. 3A depicts a portion of a lawn having dead and dying grass, and bare soil following preparation for planting with seed using a lawn perforating tool designed in accordance with the principles of the present invention. Specifically, lawn portion 2 has regions 4 of live grass, regions of dead grass 6, and regions 8 with no grass. Perforations 10 formed by an implement formed in accordance with the principles of this invention, are of a size and depth suitable for the germination of grass seed placed therein. Perforations 10 occur in regions 6 of dead grass and regions 8 of bare soil. The pattern of perforations 10 when viewed in plan view as in FIG. 3A, have an irregular spacing formed by a unique mechanism of the implement and method herein disclosed.

Figure 3B:
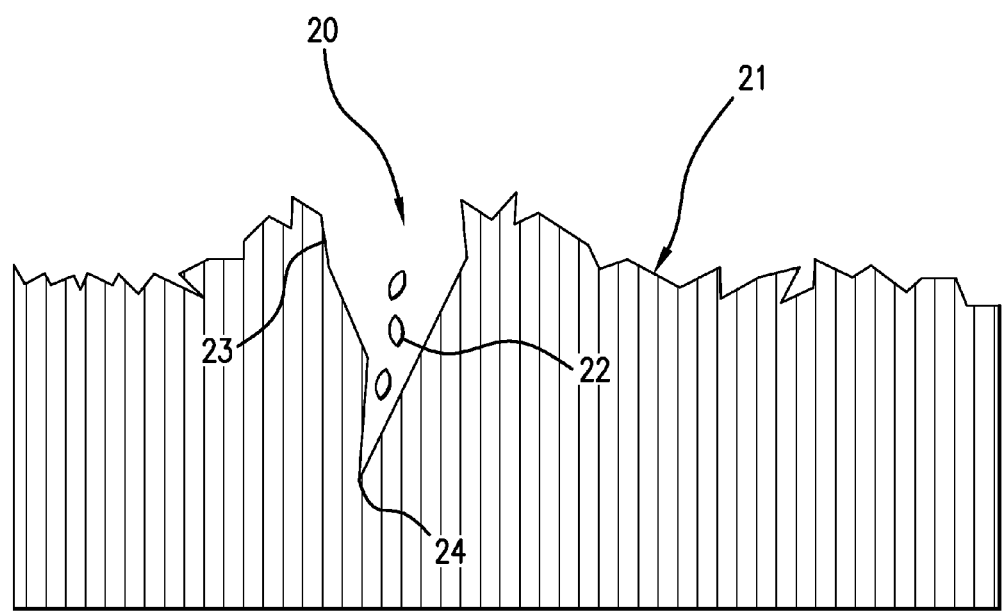
FIG. 3B depicts a hole created in soil by a lawn perforating tool designed in accordance with the principles of the present invention, more particularly a plurality seeds filling the hole. The mouth of the hole is sufficiently wide so as to readily accept seeds. The hole then tapers to a small niche, the taper funneling seeds down to contact the soil, enhancing seed-to-soil contact which is critical to germination.

FIG. 3B depicts a hole 20 created in soil 21 by a lawn perforating tool designed in accordance with the principles of the present invention, more particularly a plurality seeds 22 filling the hole. As depicted, the mouth 23 of the hole is sufficiently wide so as to readily accept one or more seeds, preferably one to five seeds. The hole then tapers to a small niche 24, the taper funneling seeds down to contact the soil, enhancing seed-to-soil contact which is critical to germination.

Figure 4A:
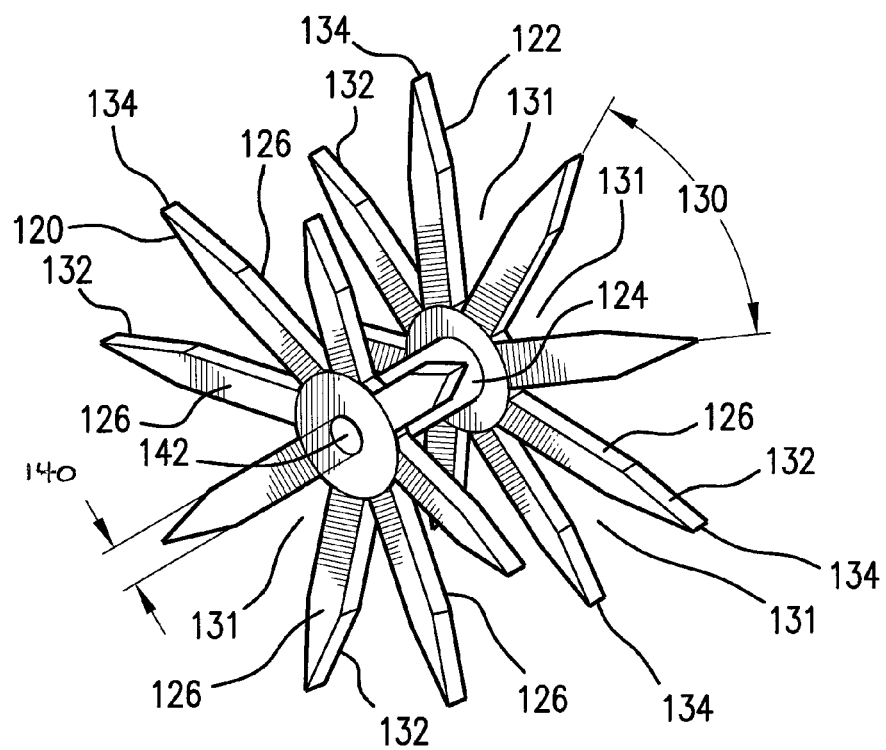
FIGS. 4A and 4B present perspective and front elevational views, respectively, of a first embodiment of the perforating plates of the present invention.
Figure 4B:
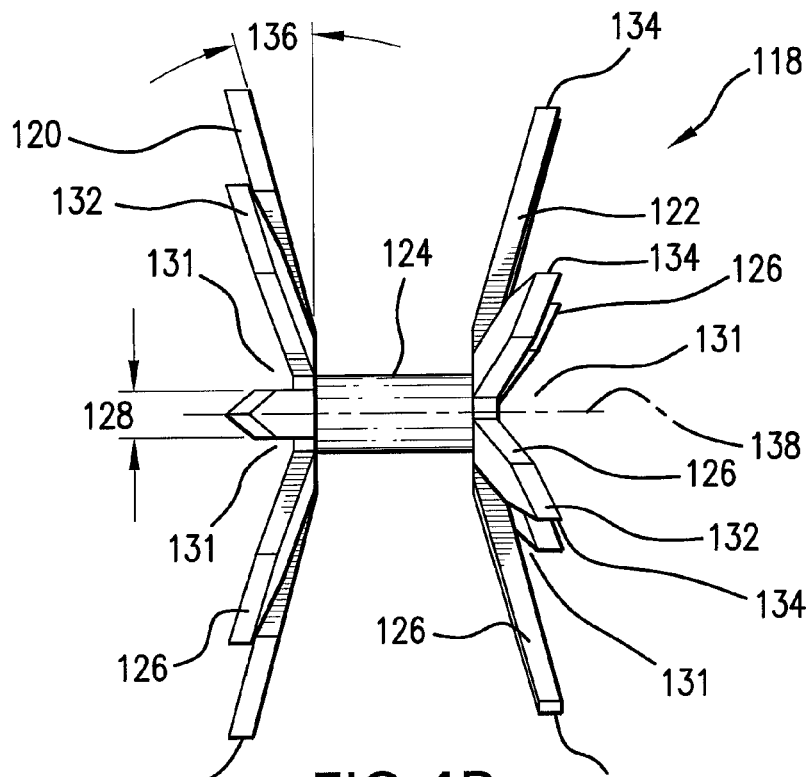
Figure 5:
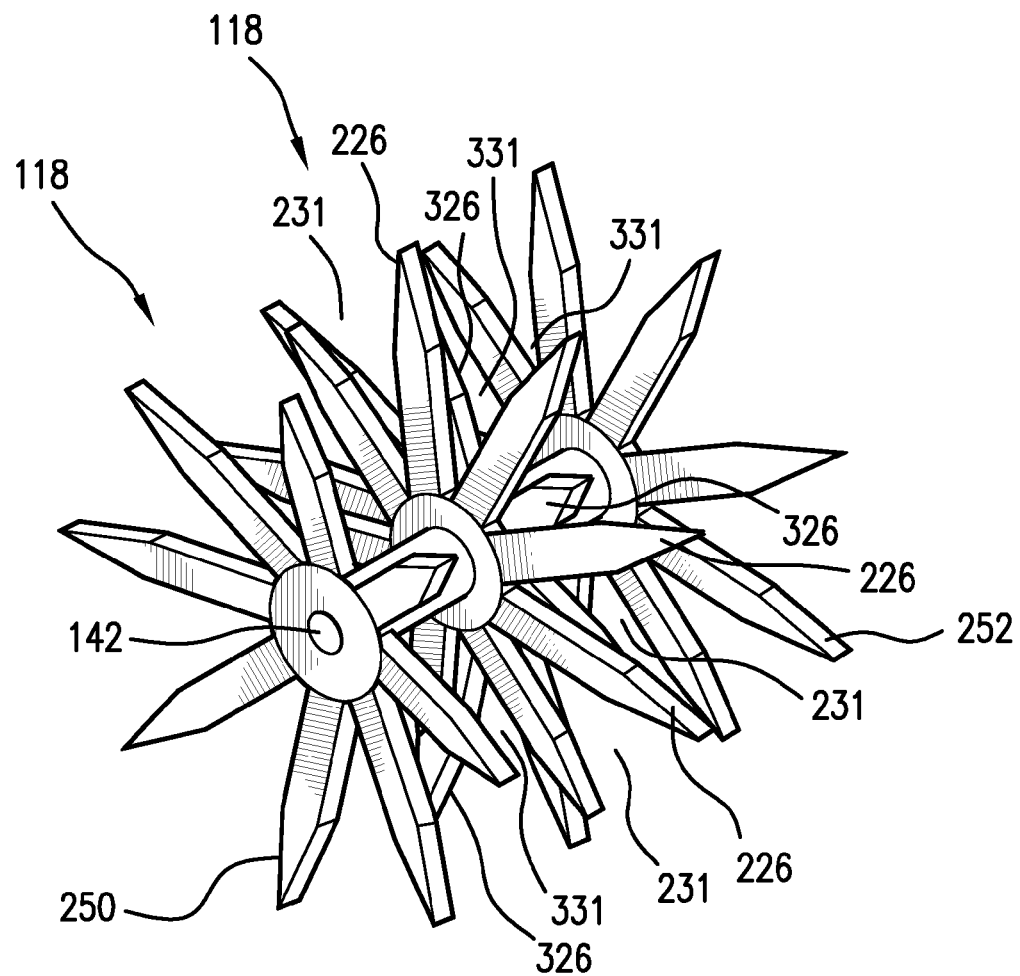
FIG. 5 is a perspective view of the perforating plates of FIG. 4 assembled in coordinating arrangement as rotatable subassemblies.
Figure 6:
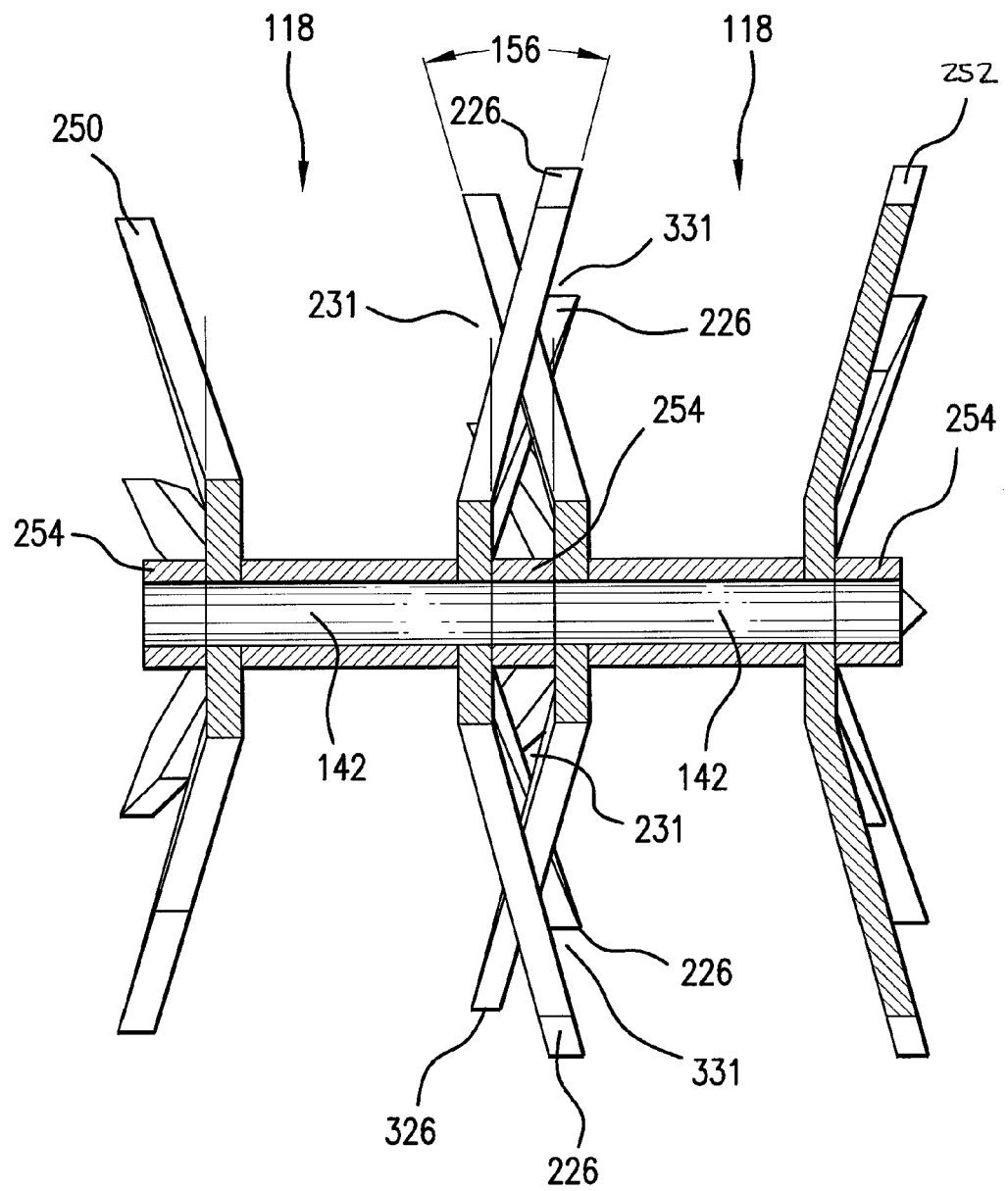
FIG. 6 is a front elevational sectional view of the objects of FIG. 5.
Figure 7:
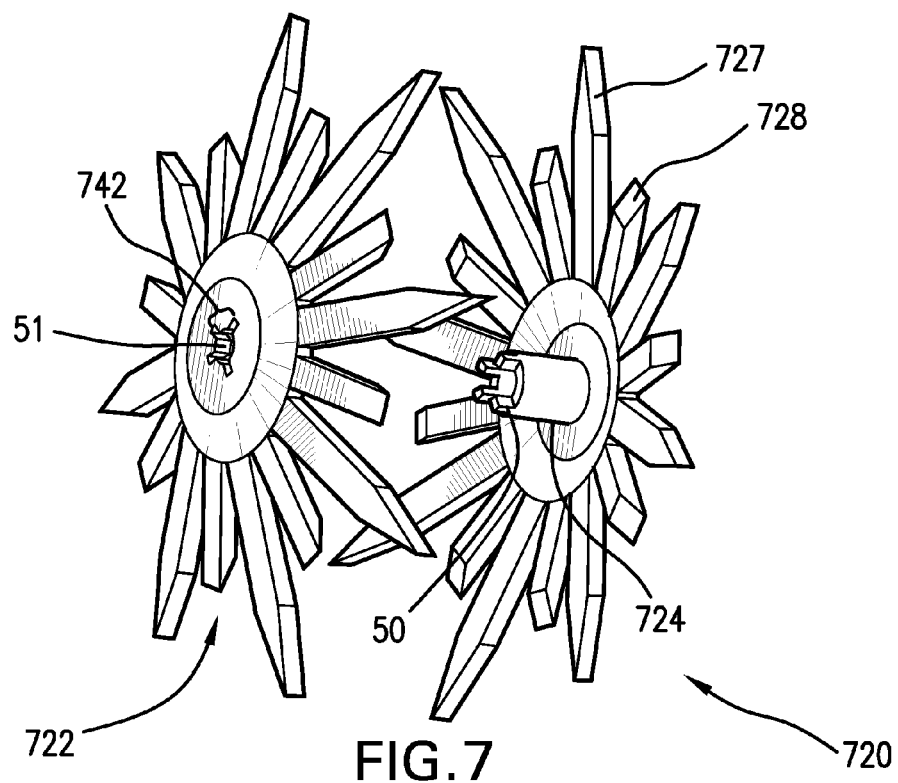
FIG. 7 is an exploded view of the perforating plates of a second embodiment, prior to assembly as facing pairs.
Figure 8:
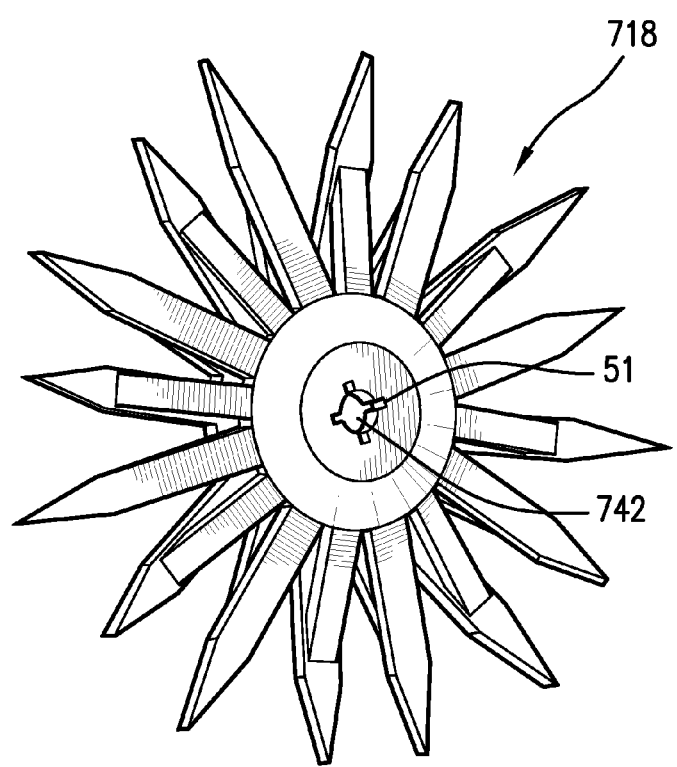
FIG. 8 is a perspective view of the facing pair of the perforating plates of FIG. 7 in mating engagement.

FIGS. 4A, 4B, and 5 provide front elevational and perspective views of a first embodiment of the perforating plates of the present invention. FIG. 6 is a front elevational sectional view of the objects of FIG. 5. Each subassembly 118 is composed of first perforating plate 120, second perforating plate 122, and spacer 124, plates 120 and 122 being optionally secured to spacer 124 by welding, brazing or other suitable mechanical fastening means. In one preferred embodiment, plates 120 and 122 are secured to spacer 124 by welding. Perforating plates 120 and 122 are each provided with a plurality of radial arms 126 of width 128, angularly spaced by angle 130 to create angular spaces 131 therebetween. Arms 126 terminate in tapered portions 132 forming knife edges 134, herein referred to as "spikes". Spikes 126 are formed to angle 136 with a plane normal to axis 138 of spacer 124. Assembly 118 has a central bore or hole 142 of diameter 140 formed therethrough.

Multiple subassemblies are aligned for assembly onto an axle through axial holes 142. As seen in FIG. 5, first subassembly 250 is separated from second subassembly 252 by second spacer 254, which is preferably not affixed to either subassembly. Radial arms 126 (designated 226) of first subassembly 250 adjacent to second subassembly 252 are positioned within angular spaces 131 (designated 231 in FIGS. 5 and 6) of second subassembly 252. Arms 126 (designated 326 in FIGS. 5 and 6) of second subassembly 252 are positioned within angular spaces 131 (designated 331 in FIGS. 5 and 6) of first subassembly 250. This relative positioning and loose meshing of arms 226 and 326 of adjacent subassemblies 118 allows first subassembly 250 to be angularly displaced (i.e., offset) relative to second subassembly 252, the maximum amount of relative displacement being determined by width 128 of spikes 126, and the angular spacing 130 between arms 126. Arms 126 of subassemblies 250 and 252 together form a wedge having an included angle 156 equal to twice angle 136.

FIGS. 7-10 depict an alternate embodiment of perforating plate and assembled plate pairs. Like the above-described embodiments, each subassembly 718 is composed of first perforating plate 720, second perforating plate 722, and spacer 724. Assembly 718 has a central bore or hole 742 of diameter 740 formed therethrough. Plate 720 may be optionally secured to plate 722 via spacer 724. In the embodiment depicted, the spacer is attached to first plate 720 and provided at its distal end with a series of splines 50 that interlock with the mating keyway 51 provided in the axial hole 742 of opposing plate 722. Perforating plates 720 and 722 are each provided with a plurality of angularly spaced radial arms 726.

Figure 9:
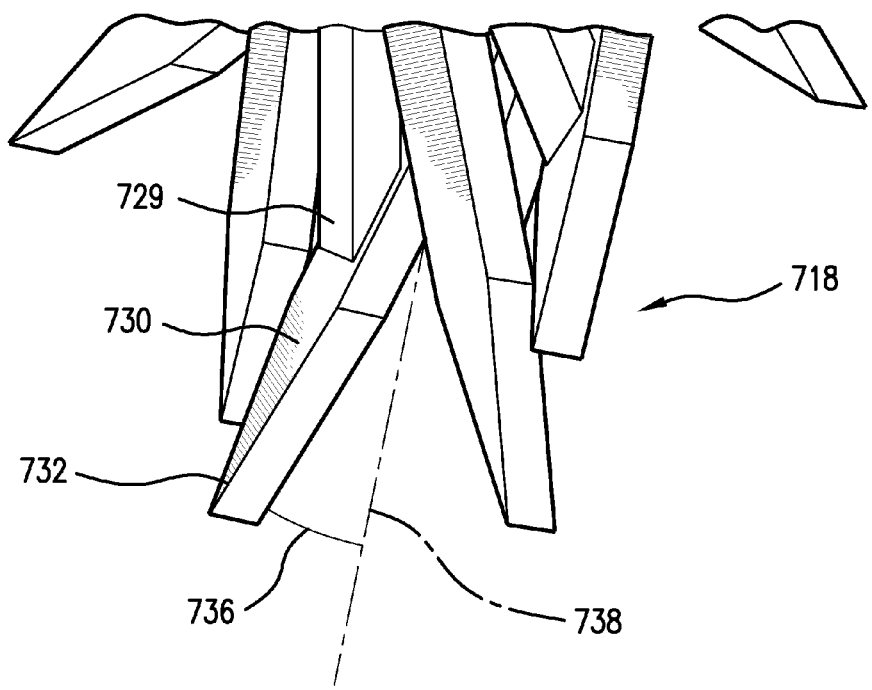
FIG. 9 is an exploded perspective view depicting the engagement between opposing spikes and spike supports of the engaged pair of perforating plates of FIG. 8.
Figure 10:
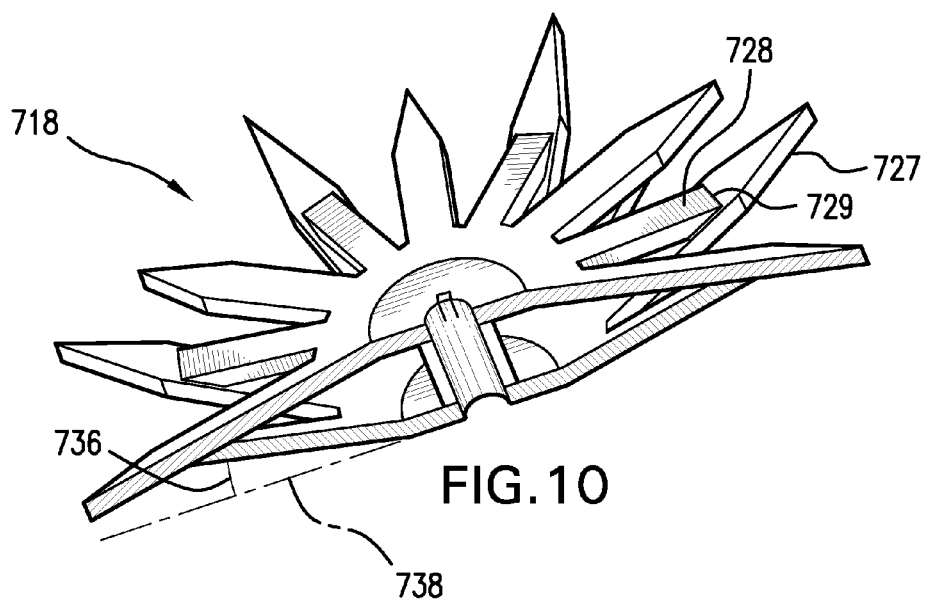
FIG. 10 is a front elevational sectional view depicting the engagement between opposing spikes and spike supports of the engaged facing perforating plates of FIG. 8 as well as the inclusion of the intervening spacer element.

Unlike the previous embodiment, the herein depicted alternate embodiment utilizes plates comprised of alternating tapered spikes 727 and spike supports 728. Spikes 727 terminate in tapered portions 732 forming knife edges 734. Both spikes and spike supports are preferably disposed at an angle 736 with a plane normal to axis 738 of spacer 724. As best shown in FIG. 9, when assembled in coordinating facing pairs 718, the beveled ends 729 of each spike support 728 of a first plate rests snugly against a side surface 730 of an opposing spike 727 on a second plate and vice versa.

This offset arrangement of opposing arms not only affords support to the spikes when penetrating soil, thereby allowing user to apply more pressure so as to reach a depth critical for seed germination, but also enhances the overall shape of the hole that each spike creates. In particular, the hole narrows from a wide mouth to a small niche hole. The wide opening is more accepting of seed spread across it (i.e., catches seeds more easily) and the narrowing furrow funnels the seed down to contact the soil, enhancing the soil to seed contact which is important for seed germination. The spike support also creates more of a plowing action. In use, it pushes up and loosens soil around the hole. The sideways puncture and the enhanced plowing together yield a soft mound of soil that will readily crumble around the seed after watering, causing increased soil to seed contact.

When assembled, the working head comprises a plurality of subassemblies 718, the arms 726 of adjacent subassemblies loosely meshing so as to allows angular displacement between adjacent subassemblies 718. Subassemblies 718 and spacers are designed to rotate freely on axle.

During use, downward force is applied to distal assembly 114 using handle 102 such that protrusions 126 are forced into the soil as assembly 114 is traversed over a region of dead grass and soil. Because subassemblies 118 and 718 are able to angularly displace from each other during rotation, the pattern of holes produced is non-uniform in spacing. The depth of the holes is determined by the downward force applied to the workhead and the wedge angle between angled arms 126 and 726. Holes produced in this manner are optimal for the germination of seed placed therein.

In preferred embodiments, subassemblies 118 and 718 are formed from a suitably durable, high tensile strength material, for example a metallic material, polymeric material, or composite material.

In the embodiments herein described subassemblies 118 and 718 rotate on an axle mounted at its end to endplates. In other embodiments distal end 106 of elongated portion 102 is affixed to the center point of an axle and subassemblies 118 and 718 rotate on lateral portions of the axle.

Arms 126 and spikes 727 of the embodiments herein described are radial, of a constant width, and have a tapered end terminating in a knife-edge. Other embodiments are anticipated in which arms 126 have other, more complex shapes. For instance, the arms may be tapered over their entire length, and/or may terminate in a blunt end (e.g., spike support 728). Similarly, the arms may be disposed at an angle relative to a radial line when viewed in plan view. The number of protrusions on each plate may be increased or decreased.

Figure 11:
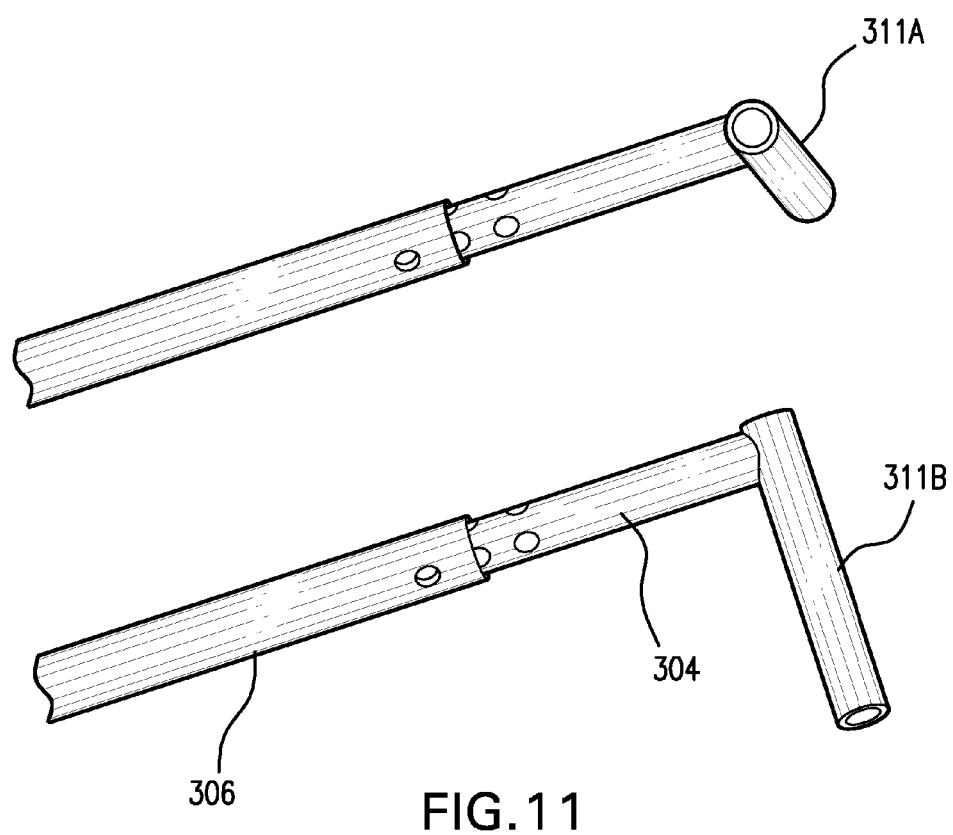
FIG. 11 is a perspective view of exemplary telescoping handles that may be used in accordance with a lawn perforating tool of the present invention.

Any embodiment of the lawn perforating tool of the present may be equipped with telescoping handles to ergonomically fit any body type. It is important that the tool be adjusted proportionately to the person using it as the action of the working head with leg/foot/arm requires the correct handle length to work comfortably and effectively. Furthermore, through correct adjustment of the telescoping handle, one can maximize the efficiency of energy transfer needed for effective use, i.e., to drive the spikes to the requisite 1 to 2 inch depth of soil penetration. An exemplary embodiment of telescoping handles, including relatively slidable proximal and distal shafts 304 and 306) is depicted in FIG. 11. Handles 311A and 331B may optionally be fitted with elastomeric covers (not shown) as desired.

INDUSTRIAL APPLICABILITY

The lawn perforating tool of the present invention is ideally suited to repairing damaged areas of existing lawn and preparing such for reseeding.

All patents and publications mentioned herein are incorporated by reference in their entirety. Nothing herein is to be construed as an admission that the invention is not entitled to antedate such disclosure by virtue of prior invention.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. For example, the invention disclosed could be provided with, for example, a larger or smaller handle, a motor and/or other attachments without departure from the spirit of the invention.

Other advantages and features will become apparent from the claims filed hereafter, with the scope of such claims to be determined by their reasonable equivalents, as would be understood by those skilled in the art. Thus, it should be understood that the invention is intended not to be defined by the foregoing description, but by the appended claims and their equivalents.

What is claimed:

1. A lawn perforating tool comprising:
   (a) an elongate handle portion having a proximal end and a distal end;
   (b) a working head transversely mounted to the distal end of said handle portion, said working head having at least one axle; and
   (c) an even number of perforating plates rotatably disposed about said axle, each of said plates comprising a central bore defining a bore axis and a plurality of radial arms extending from said central bore, wherein said radial arms alternately comprise a long tapered spike and a relatively shorter beveled spike support, at least one of which is positioned at an angle relative to a plane that is normal to the bore axis, further wherein said perforating plates are arranged opposite one another in facing pairs offset in such a manner such that at least one of the tapered spikes of a first plate extends between two tapered spikes of an opposing plate and at least one of the beveled spike supports of a first plate rests snugly against a side surface of a tapered spike on an opposing plate.

2. The lawn perforating tool of claim 1, wherein each set of facing pairs is axially separated from an adjacent set of facing pairs by means of a tubular spacer which is also rotatably disposed about said axle, said spacer being affixed to adjacent plates so as to maintain correct alignment of neighboring radial arms and prevent relative movement between said plates.

3. The lawn perforating tool of claim 2, wherein said spacer is attached to each of said plates by a mechanical fastening means.

4. The lawn perforating tool of claim 2, wherein the central bore of each plate is provided with means for engaging a mating element on said spacer.

5. The lawn perforating tool of claim 1, wherein the number of radial arms on each plate ranges from four to eight.

6. The lawn perforating tool of claim 1, wherein the number of plates on each axle ranges from eight to sixteen.

7. The lawn perforating tool of claim 1, wherein each of said tapered spikes, together with its opposing spike support, provides a sideways extending lawn perforation that is 1 to 2 inches in depth.

8. The lawn perforating tool of claim 1, said tool capable of providing a dense, non-uniform pattern of indentations in a lawn.

9. The lawn perforating tool of claim 1, wherein said plates are formed from a high tensile strength material or by means of a high strength fabricating method.

10. The lawn perforating tool of claim 9, wherein said material is selected from the group consisting of metals, polymers, and composite materials.

11. The lawn perforating tool of claim 9, wherein said material is a metal selected from the group consisting of stamped aluminum and laser cut aluminum.

12. The lawn perforating tool of claim 1, wherein said handle portion comprises a pair of parallel shafts, each of which is provided with an elastomeric hand grip at its proximal end.

13. The lawn perforating tool of claim 12, wherein each hand grip is disposed at an angle relative to the axis of the shaft to which it is attached.

14. The lawn perforating tool of claim 12, wherein said parallel shafts each comprise a pair of telescoping tubes.

15. The lawn perforating tool of claim 12, wherein said shafts are linear.

16. The lawn perforating tool of claim 12, wherein said shafts are bent.

17. The lawn perforating tool of claim 1, wherein said handle portion comprises a single shaft provided with a transverse handle bar at its proximal end, further wherein each end of the handle bar is provided with an elastomeric hand grip.

18. The lawn perforating tool of claim 17, wherein said shaft comprises a pair of telescoping tubes.

19. The lawn perforating tool of claim 17, wherein said shaft is linear.

20. The lawn perforating tool of claim 17, wherein said shaft is bent.

21. The lawn perforating tool of claim 1, wherein said handle portion comprises a single bent shaft comprised of a pair of telescoping tubes, said shaft provided with a first hand grip at the proximal end and a second hand grip extending from the shaft in a transverse fashion at or near the bend.

22. The lawn perforating tool of claim 1, wherein said working head comprises a frame composed of a foot bar mounted above and parallel to said at least one axle, said foot bar and axle connected at either end by a pair of side arms.

23. A method of repairing lawn damage comprising the steps of:
   (a) providing the lawn perforation tool of claim 1, wherein said radial arms are capable of providing a plurality of lawn perforations having an overall depth ranging from 1 to 2 inches and being suitable for receiving grass seed;
   (b) moving said lawn perforation tool over an area of damaged lawn so as to yield a random array of such lawn perforations.

24. The method of claim 23, wherein the movement of step (b) involves repeating moving the lawn perforation tool over the area of damaged lawn in back and forth manner, said movement resulting not only in the formation of a random array of lawn perforations but also the loosening of adjacent soil.

25. The method of claim 23, wherein said movement is man-powered.

26. The method of claim 23, wherein said movement is engine-powered.

27. The method of claim 23, wherein said movement is provided by a tractor to which the lawn perforation tool is attached.

28. The method of claim 23, wherein each of said lawn perforation narrows from a wide mouth to a small niche hole.

29. The method of claim 23, further comprising the step of spreading seed across the random array of lawn perforations.

* * * * *